United States Patent

[11] 3,634,093

| [72] | Inventor | Chian L. Huang |
| | | University, Miss. |
| [21] | Appl. No. | 866,368 |
| [22] | Filed | Oct. 14, 1969 |
| [45] | Patented | Jan. 11, 1972 |
| [73] | Assignee | The University of Mississippi |
| | | University, Miss. |

[54] DETOXICATION OF TUNG MEAL
19 Claims, No Drawings

[52] U.S. Cl.................................................. 99/2 R,
99/17, 99/20 E, 260/412.4
[51] Int. Cl.............................................. A23k 1/00
[50] Field of Search........................................ 99/20 E, 2
R, 17, 14; 260/412.2, 412.4

[56] References Cited
UNITED STATES PATENTS
1,955,375  4/1934  Cone et al..................... 99/17 X

| 2,641,542 | 6/1953 | Ulrey......................... | 99/20 E |
| 2,762,820 | 9/1956 | Sugarman..................... | 99/17 X |
| 2,928,821 | 3/1960 | Chayen....................... | 99/17 X |

OTHER REFERENCES
Chemical Abstract, Lee et al., Vol. 47– 1865d, 1953.
Chemical Abstracts, Emmel, M. W., Vol. 42– 2367h, 1947.
Chemical Abstracts, Mann et al., Vol. 48– 5397g, 1954.

*Primary Examiner*—Norman Yudkoff
*Assistant Examiner*—Kenneth Van Wyck
*Attorney*—William D. Stokes

ABSTRACT: Commercial tung meal may be detoxicated to prepare an animal feed or fertilizer rich in protein and carbohydrate by macerating the meal in water followed by the extraction of toxic substances therefrom with an alcohol.

DETOXICATION OF TUNG MEAL

Tung trees are grown in abundance in the Western Hemisphere along the Gulfcoast of the United States, particularly in the southeastern states of Louisiana, Mississippi, Alabama, Georgia and Florida, and in South America. Until the present invention, the prime commercial interest in tung trees has been in the oil which is extracted from the fruit of the plant. Tung oil is a pale yellow, pungent, drying oil composed chiefly of unsaturated fatty acid glycerides useful as a waterproofing agent and as a component of quick-drying varnishes and paints.

Tung meal, composed primarily of particulate tung kernels, is obtained as a byproduct from the processing of the fruit for its oil content. The meal may be contaminated with substantial amounts of comminuted tung hull, depending upon the particular extraction process employed.

It has long been recognized by workers in the art that tung meal, having a high protein content, could be useful as an animal feed or fertilizer except for the presence of toxins which render it unfit for animal consumption. An inexpensive and commercially feasible process for the detoxication of tung meal for producing an animal feed or fertilizer is not available at the present time. The present invention is directed toward solving this problem by disclosing a process which may be employed commercially for the detoxication of tung meal.

Several workers have studied the toxicity of tung meal in attempts to define and isolate the toxic principles thereof as well as to devise methods for their separation from the comestible fractions of the meal. The exact chemical structures of the toxic materials present in tung meal are not known. It is believed that their are at least two toxins present, one being substantially insoluble in the common organic solvents such as ether and ethyl alcohol and relatively thermolabile, and the other being relatively heat stable and soluble in such solvents. Detoxication has been attempted by ammoniation, various extraction procedures and treatment with heat or heat pressure. Among the extraction reagents disclosed in the prior art, there may be mentioned benzoline, naphtha, petroleum ether, and ethyl alcohol [Erickson and Brown, *J. Pharmacol. Exptl. Therap.*, 74, 115 (1942)]. Ethyl alcohol extraction combined with preliminary moistening and steaming has been suggested by Lee and Watson, *J. Am. Oil Chemists' Soc.*, 30, 32 (1953). Mann et al. [*Agricult. Food Chem.*, 2, 258 (1954)] have reported that such prior art treatments do not completely remove the poisonous substances from tung meal and, thus, result in only partial detoxication thereof. Additionally, comparative tests have shown that animal feeds prepared from tung meal detoxified according to prior art methods do not produce growth rate patterns in test animals equivalent to those obtainable with the present commercially available protein-carbohydrate animal feeds. Often, the test animals have exhibited undesirable side effects such as voluntary food restriction, hypertension and restlessness. It has been speculated that these deficiencies may be because of a disagreeable taste imparted to the final product, formation of new toxic substances or the removal of desirable protein and carbohydrate matter, all as a result of the particular purification process employed.

This invention relates to a novel process for the preparation of a comestible product from tung meal. More particularly, it concerns a novel process for the removal of all toxic matter from tung meal.

The process of this invention, which will be more fully described in the detailed description of the preferred embodiments hereinafter, may be summarized by the following flow sheet, indicating essential and optional features thereof.

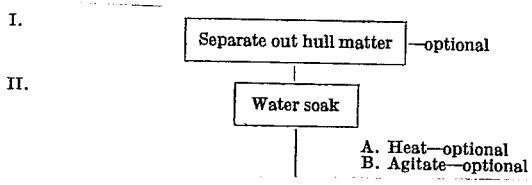

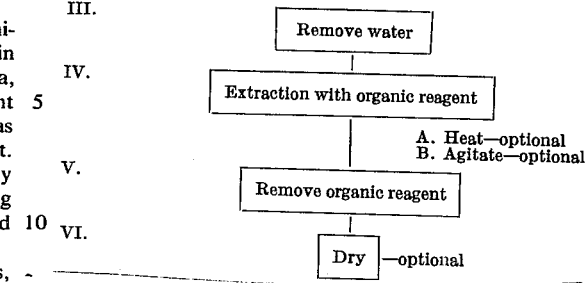

The use of the disclosed process for detoxicating tung meal enables the preparation of a palatable animal feed product which is essentially nontoxic and which produces growth rate patterns in animals comparable to those resulting with conventional animal feeds.

Therefore, a prime object of this invention is to disclose a novel process which may be employed for the detoxication of tung meal.

Another object is to disclose a novel process which may be employed to prepare a palatable animal feed rich in protein and carbohydrate from tung meal produced as a byproduct in tung oil extraction processes.

A further object is to disclose a novel process which may be employed to prepare a fertilizer high in available nitrogen from tung meal produced as a byproduct in tung oil extraction processes.

A further object is to disclose a novel process for the detoxication of tung meal which is inexpensive and commercially feasible.

Other objects will appear in the detailed description hereinafter.

As described hereinbefore, tung meal produced as a byproduct from the extraction of tung nuts for their oil content, depending upon the particular extraction process employed, will consist essentially of particulate kernel or particulate kernel admixed with comminuted tung hull. In either case, the use of the term "tung meal" as employed herein refers to a product essentially free of tung oil.

Two processes are predominantly in use in the Western Hemisphere for tung oil extraction. In both processes, preliminary to actual oil extraction, the tung nut must be dehulled. At this point a critical distinction occurs depending upon whether mechanical or chemical extractive means are to be employed.

In the United States, the principal means of tung oil extraction involves the application of mechanical force, such as by the use of a press mill, to the tung kernels for physically squeezing the oil therefrom. Typically, in such a process, about 15 to 20 percent by weight, based on the weight of the tung kernels present, of particulate tung hull is admixed with the kernels prior to pressing to prevent the formation of a sticky cake in the press mill. This initial pressing forces about 85 percent of the oil present out of the kernels. The balance of the oil, usually about 15 percent of the original quantity, is extracted with a solvent, preferably hexane. Thus, commercial tung meal obtained from U.S. processors will normally contain about 30 percent by weight of hull as extraneous matter admixed with the kernel.

If the extraneous hull matter is not removed prior to the employment of the inventive purification process, the final product will be high in cellulose and ash content, giving the feed a lower nutritional value. Since the hull particles are larger than the kernel particles, the two may be segregated by a variety of methods which will appear obvious to those skilled in the art. It has been found that sifting the admixture thru a 10 to 100 mesh sieve is a satisfactory method for the separation of hull matter from kernel matter. Preferably, a 20 mesh sieve (which will effectively remove about 85 to 90 percent of the shell particles present) is employed.

Modern tung nut processing plants, principally found in South America, extract the oil by means of a 100 percent chemical process and do not require the inclusion of tung hull particles in the raw material. When tung meal from such a total solvent extraction method is employed in the inventive process, the initial optional separating step may be omitted.

To convert the tung meal into a form which can be utilized as a protein supplement in feedstocks, the following novel process has been found to suitably remove the toxins present:

The commercial tung meal, substantially free of extraneous hull matter, is subjected to total aqueous maceration. The meal is placed in a suitable container along with a quantity of water sufficient to cover it and allowed to steep therein. The pH of the medium was adjusted to 0.1–7.0. Best range of the pH has been established to be between 1–3 at which bacterial action on tung meal was controlled during the soaking period. Mineral acids, such as hydrochloric acid, sulfuric acid, nitric acid, perchloric acid, etc., and organic acids, such as acetic acid, benzoic acid, salicylic acid, etc., can be used for this purpose. In these embodiments, hydrochloric acid and occasionally, benzoic acid was used to adjust the pH of water used for soaking tung meal.

Generally, the volume of water required will depend upon the quantity of meal present. Typically, 1 to 10 parts by weight of water per part of meal will be necessary for adequate maceration of the meal. It has been found that a ratio of water to meal by weight of 3 to 1, when permitted by the particular vessel in use, results in the production of a superior detoxified product.

The pH of the aqueous maceration suspension is adjusted to pH 1–3 to prevent fermentation during soaking. Purified water is not required, tap water yielding equally good results. Although warm to hot water appears to enhance the effectiveness of the later organic solvent extraction of toxins, water temperature is not critical and may range from about 0° to 100° C.

The soaking period may vary from about 1 to 96 hours, and preferably is 12 hours. With water soaking, tung meal swells to 3–5 times.

The application of heat with concomitant agitation facilitates water penetration of cell walls as is evidenced by an observable swelling of the meal. Maximum aqueous absorption occurs at about 80° C. If the mixture, with agitation, is maintained at about 80° C. for about 12 hours, maximum conditioning of the meal occurs.

The initial steeping or soaking of the tung meal in water facilitates the removal of poisonous components of the meal by the later organic solvent extraction step. This is distinguished from prior art processes, as described hereinbefore, which disclose a combined moistening-steaming treatment prior to solvent extraction. The unexpected enhancement of solvent detoxication brought about by total aqueous maceration of the tung meal is illustrated by comparative tests in example IV, infra.

Following the aqueous treatment, the extract may be separated from the meal by a number of obvious procedures. Among these, there may be mentioned for illustrative purposes, decantation, compression, centrifugation, and vacuum filtration.

It is not necessary that total water removal be accomplished or even attempted. The organic solvent extractant will flow through the cell walls by osmosis, replacing substantially all of the water therein before equilibrium is reached.

Although the preferred process herein disclosed employs an alcohol as the organic extractant, the preliminary aqueous maceration treatment may be used as well to condition tung meal prior to the treatment of the meal with other organic extractants.

In the process of this invention, 1 to 10 parts by weight of an alcohol per part of meal is admixed with the tung meal residue from the aqueous conditioning step. Again, sufficient organic solvent is employed to allow essentially complete maceration of the tung meal therein. Preferably, solvent is added to the meal in the ratio of 3:1.

Temperature is not critical and may vary from about 0° C. to 100° C. during a steeping period of about one-half to 24 hours with or without intermittent or continuous agitation. It has been found that when the admixture is maintained at a temperature of about 60° C. for about 1 hour, with concomitant agitation, maximum extraction of toxins occurs.

Upon termination of the extraction period, the organic extractant is separated from the meal by any convenient process, such as centrifugation, filtration, compression or decantation.

In the preferred process, the organic extractant is an alcohol containing about one to nine carbon atoms. The essential criteria for choosing a particular alcohol are that it is able to penetrate the cellular membranes to reach an optimal equilibrium with water and is capable of bringing about dissolution and removal of the toxins initially present in the cells. The alcohol will generally be selected from the group consisting of methanol, ethanol, propanol, butanol, pentanol, hexanol, heptanol, octanol and nonanol, all of which yield satisfactory results. The solvent of choice is ethanol.

The alcohol extraction step may be repeated one to 20 times depending upon operating conditions. It has been found that when the preferred procedure disclosed hereinbefore is employed, 1 hour at 60° C., the sequence should be repeated three times. In other words, the meal should be subjected to alcoholic extraction a total of four times.

A suggested procedure for performing the alcoholic extraction is by the use of a continuous percolation process. Superior results have been achieved with a Soxhlet extractor operating continuously for about 2 days with ethanol reagent at room temperature.

Following completion of the above process, the tung meal may be dried and utilized as a fertilizer or animal feed. The palatable, nontoxic meal may be offered to animals as such or formulated either alone or with other ingredients such as vitamins and minerals into any desired dosage form. For example, biscuits may be prepared by shaping the meal with water followed by baking. Nearly all lower forms of life may be offered tung meal as a sole foodstuff or adjunct to the diet, i.e., cattle, pigs, poultry, fish and birds.

The following examples may be offered as illustrating the invention. These are exemplifications only and the scope of the invention is to be determined by the appended claims.

EXAMPLE I

Factory Tung Meal
(10 lbs.)
↓
Soaked in 20 liters of water at 25° C. for 24 hours
↓
Strong odor of ammonia and carbon dioxide generated from tung meal. This is a sign of bacterial growth and fermentation.

EXAMPLE II

Factory tung meal
(10 lbs.)
↓
Soaked in 10 liters of water at 10° C., pH 2 for 8 hours.
↓
Extracted with 10 liters of methanol ten times.
↓
Washed once with 10 liters of ethanol and dried
This material was not toxic.

EXAMPLE III

Factory tung meal
(10 lbs.)
|
Soaked in 10 liters of water at
25° C., pH 1 for 24 hours.
|
Extracted with 10 liters of
methanol ten times.
|
Washed with 10 liters of ethanol and dried.
This preparation was not toxic.

EXAMPLE IV—COMPARATIVE TESTS

Comparative feeding tests on mice with Lee & Watson's method, alcohol alone and the present method:

Control group of animals were fed with Purina animal feed, and experimental group of animals were fed with Purina animal feed containing 20 percent tung meal preparation.

| Tung meal treatment | Methods | No. of animals | No. died | No. alive |
|---|---|---|---|---|
| Lee & Watson | Control | 12 | 0 | 12 |
|  | Test | 12 | 5 | 7 |
| Alcohol extraction | Control | 12 | 0 | 12 |
|  | Test | 12 | 3 | 9 |
| Preliminary H₂O treatment and alcohol extraction | Control | 12 | 0 | 12 |
|  | Test | 12 | 0 | 12 |

Composition of Feed:
| | |
|---|---|
| Crude protein | 35.0% |
| Crude fat | 1.0 |
| Crude fiber | 10.0 |
| Calcium | 3.5–4.5 |
| Phosphorus | 1.1 |
| Iodine | 0.0003 |
| Salt | 2.0–3.0 |
| Minerals | 12.0 |
| Water | 35.0–36.0 |

EXAMPLE V

Comparative testing of animal feeds was conducted to evaluate the use of detoxicated tung meal as a protein supplement in the feeding of chicks. The feeding containing detoxified tung meal was prepared by taking 8 parts of "Purina" animal feed and adding 2 parts detoxified tung meal (about 20 percent detoxified tung meal). The control group of chicks was fed "Purina" animal feed without tung meal. The feed was available to the chicks at all times. Tests results on growth rates were as follows:

GROWTH RATE OF CHICKS FED WITH FORMULATION CONTAINING DETOXIFIED TUNG MEAL
[Weight of chicks in grams]

| Day | Control group | | | Experimental group | | |
|---|---|---|---|---|---|---|
|  | Max. | Min. | Avg. | Max. | Min. | Avg. |
| 0 | 62.0 | 51.9 | 57.7 | 63.7 | 51.5 | 56.6 |
| 1 | 77.5 | 58.9 | 66.9 | 73.9 | 54.4 | 64.2 |
| 2 | 81.6 | 63.9 | 71.6 | 79.5 | 64.5 | 70.5 |
| 3 | 93.6 | 70.1 | 79.9 | 85.8 | 68.1 | 75.8 |
| 4 | 103.1 | 80.1 | 91.2 | 99.1 | 69.0 | 83.0 |
| 5 | 108.8 | 86.5 | 96.5 | 107.9 | 75.3 | 90.9 |
| 6 | 116.1 | 94.6 | 103.1 | 111.2 | 83.1 | 96.2 |
| 7 | 136.1 | 110.8 | 112.6 | 139.5 | 98.5 | 119.2 |
| 8 | 146.5 | 113.5 | 128.5 | 145.7 | 106.1 | 124.9 |
| 9 | 161.4 | 129.2 | 144.3 | 171.1 | 122.6 | 143.7 |
| 10 | 180.5 | 148.0 | 156.7 | 172.1 | 136.1 | 151.6 |
| 11 | 210.5 | 156.2 | 167.7 | 190.3 | 144.0 | 167.0 |
| 12 | 218.5 | 174.5 | 189.1 | 209.5 | 157.1 | 198.0 |
| 13 | 226.5 | 180.9 | 202.9 | 234.1 | 174.2 | 202.1 |
| 14 | 254.1 | 196.6 | 216.0 | 243.4 | 181.4 | 209.0 |
| 15 | 281.0 | 207.2 | 236.4 | 258.3 | 188.7 | 225.8 |
| 16 | 317.1 | 225.5 | 252.3 | 295.7 | 219.0 | 251.4 |
| 17 | 324.4 | 249.7 | 271.8 | 310.0 | 219.0 | 260.1 |
| 18 | 351.6 | 270.6 | 288.1 | 337.2 | 245.6 | 279.3 |
| 19 | 362.9 | 280.0 | 306.1 | 376.4 | 270.1 | 303.3 |
| 20 | 380.1 | 300.1 | 329.1 | 380.1 | 295.4 | 328.2 |

Ingredients of Purina Animal Feed:

Soybean meal, cotton seed meal, fish meal, meat and bone meal, hydrolyzed poultry feathers, condensed fish solubles, cane molasses, dehydrated alfalfa meal, wheat middlings, vitamin A supplement, D activated animal sterol, vitamin $B_{12}$ supplement, riboflavin supplement, niacin, calcium pantothenate, low florine rock phosphate, calcium carbonate, iodized salt, iron sulfate, iron oxide, manganese sulfate, manganous oxide, copper oxide, cobalt carbonate, zinc oxide.

EXAMPLE VI

The following experiments were made to define the toxicity of tung meal after treatment by other methods in an attempt to achieve a nontoxic product. In each case, however, a high degree of toxicity was observed after each of the treatments employed. By contrast, as detailed above, treatment in accordance with this invention yields a nontoxic product.

TREATMENT APPLIED TO TUNG MEAL AND RESULTS OF FEEDING TEST ON RATS

| Treatment | No. of animals | No. of deaths | Number survived | Observations |
|---|---|---|---|---|
| Water | 5 | 4 | 1 | Animals died within 10 hours. Necrosis of the liver; intestinal bleeding. |
| Acid hydrolysis | 5 | 5 | 0 | Noted symptom was polyuria. After a few days death occurred. |
| Ultraviolet light | 5 | 5 | 0 | All animals died within 5 hrs., preceeded by intestinal bleeding. |
| Ozonolysis | 5 | 5 | 0 | All animals died after 1 week. |

Although applicant does not wish to be bound by any particular theory, it is believed that total aqueous maceration of the tung meal serves at least a twofold purpose. First, any hydrophillic toxic substances present are removed and, second, the cell walls are conditioned for maximum organic solvent penetration therethrough.

What is claimed is:

1. A process for detoxicating tung meal and preparing the same for food, which comprises:
   a. soaking the tung meal in water, having a pH value of from 0.1 to 7.0, to swell and macerate the meal; and
   b. removing the water and dissolved matter; and
   c. extracting the remaining toxic matter from the tung meal with an organic solvent for the said toxic matter.

2. The process of claim 1 wherein step (a) is conducted in conditions substantially resistant to fermentation and continued for at least 1 hour.

3. The process of claim 1 wherein the organic solvent is selected from the group consisting of saturated alcohols containing from one to nine carbon atoms.

4. The process of claim 3 wherein step (a) is conducted in a substantially acid condition to provide substantial resistance to fermentation.

5. The process of claim 1 wherein the organic solvent is ethanol.

6. The process of claim 1 wherein the acid condition is a pH value of 1 to 3.

7. The process of claim 1 wherein:
   1. in process step (a) the tung meal is soaked in from about one to about 10 times its weight of water at a temperature of from about 0° C. to 100° C. for a period of about 1 to 96 hours until the meal is swollen; and 2. in process step (c) the dewatered swollen tung meal is treated with from about one to about 10 times its weight of a lower alcohol at a temperature of about 0° C. to about 100° C. for a period of at least one-half hour.

8. The process of claim 1 wherein:
1. in process step (a) the tung meal is soaked in about three times its weight of water maintained at a temperature of about 80° C. for about 12 hours; and
2. in process step (c) the dewatered swollen tung meal is treated with about three times its weight of alcohol at a temperature of 60° C. for about 1 hour.

9. The process of claim 8 wherein step (c) is repeated from one to 19 times and the alcoholic solution of toxic matter is removed between treatments with alcohol.

10. The process of claim 9 wherein the alcohol is ethanol.

11. The process of claim 10 wherein the step (c) is repeated three additional times.

12. A sequential process for preparing a foodstuff from tung meal containing particulate tung hull, which comprises:
a. removing a portion of the hull material from the tung meal;
b. soaking the tung meal in from about one to about 10 times its weight of water at a pH from about 0.1 to 7.0, to macerate, and swell the meal and to dissolve water-soluble toxic matter;
c. separating the water and dissolved toxic matter from the swollen tung meal;
d. extracting toxic matter from the dewatered swollen tung meal with a lower aliphatic alcohol; and
e. separating the alcohol and toxic matter from the tung meal.

13. The process of claim 12 wherein the sequence (d) through (e) is repeated two to 20 times.

14. The process of claim 12 wherein the tung meal is dried after step (e).

15. The process of claim 12 wherein:
1. in process step (a) the tung meal is sifted through a sieve having a mesh size of the range of 10 to 100 openings per inch; and
2. in process step (b) the sifted tung meal is soaked in water at a temperature of about 0° C. to 100° C. for a period of from about 1 to about 96 hours; and
3. in process step (d) the water-soaked swollen dewatered tung meal is treated with about one to 10 times its weight of the alcohol at a temperature of about 0° C. to about 100° C. for a period of about ½ to 24 hours.

16. The process of claim 15 wherein:
1. in process step (a) the tung meal is sifted through a 20 mesh sieve;
2. in process step (b) the sifted tung meal is soaked in three times its weight of water at a temperature of about 80° C. for about 12 hours while being agitated;
3. in process step (d) the toxic matter is extracted by contact with about three times its weight of an alcohol selected from a group consisting of methanol, ethanol, propanol, butanol, and pentanol at a temperature of about 60° C. for about an hour while being agitated, and wherein the tung meal is dried following process step (e).

17. The process of claim 16 wherein the alcohol is ethanol.

18. The process of claim 16 wherein the sequence of process steps (d) thru (e) is repeated three additional times prior to the drying step.

19. The process of claim 18 wherein the alcohol is ethanol.

* * * * *